United States Patent

Otani et al.

[11] Patent Number: 5,863,448
[45] Date of Patent: Jan. 26, 1999

[54] MANUFACTURING METHOD FOR A THIN FILM MAGNETIC HEAD

[75] Inventors: Koichi Otani; Daisuke Iitsuka; Ryuji Kobo; Masayuki Hamakawa, all of Mishimagun, Japan

[73] Assignee: Read-Rite Corporation, Osaka, Japan

[21] Appl. No.: 758,228

[22] Filed: Nov. 27, 1996

[30] Foreign Application Priority Data

Nov. 29, 1995 [JP] Japan ................................ 7-332565

[51] Int. Cl.⁶ ...................................................... B44C 1/22
[52] U.S. Cl. .............................. 216/22; 216/38; 216/39; 216/41
[58] Field of Search ............................. 216/22, 38, 39, 216/41

[56] References Cited

U.S. PATENT DOCUMENTS

| | | | |
|---|---|---|---|
| 5,141,623 | 8/1992 | Cohen et al. | 216/22 X |
| 5,462,637 | 10/1995 | Thele | 216/22 |
| 5,554,265 | 9/1996 | Bonyhard et al. | 216/22 X |

FOREIGN PATENT DOCUMENTS 63-55711   3/1988   Japan .
5-334621  12/1993   Japan .

*Primary Examiner*—William Powell
*Attorney, Agent, or Firm*—Blakely Sokoloff Taylor & Zafman, LLP.

[57] ABSTRACT

A method of manufacturing a thin film magnetic head. In one embodiment, a lower magnetic pole and a magnetic film are formed on a substrate that is covered by an insulating film. A mask is then formed on the lower magnetic pole. The mask and the lower magnetic pole are then ion milled to the same width. A protective film is then formed to sufficiently cover then lower magnetic pole and the mask. The protective film is then polished to expose the mask. An exposed surface of the mask and the protective film are then planarized and the remaining make is then removed by wet etching. A concavity is formed at a position in the lower magnetic pole in the protective film. An upper magnetic pole is then formed by electroplating on the concavity. The mask is formed by electroplating Cu or permalloy, or by patterning photoresist.

3 Claims, 5 Drawing Sheets

MANUFACTURING METHOD FOR A THIN FILM MAGNETIC HEAD

BACKGROUND OF THE INVENTION

1. Field of the Invention

The present invention relates to a manufacturing method for a thin film magnetic head that is used in, for example, magnetic disk devices and recording/playback devices in computers and wordprocessors, in particular, to a manufacturing method for a thin film magnetic head that uses photolithographic technology to form the upper and lower magnetic poles by electroplating.

2. Background Information

Recently, because recording densities increase as the capacity of the magnetic disk recording devices increase, thin film magnetic heads have been widely applied. They are fabricated by using deposition technologies, such as electroplating and sputtering, and fine processing technologies based on photolithography. As shown in FIG. 3A, a conventional thin film magnetic head deposits an insulating film 2 on a substrate 1 of a ceramic material, forms the lower magnetic film 3 and the magnetic gap film 4 on top, and after depositing the conducting film 7 between the organic insulating films 5, 6, and the upper magnetic film 8 is formed and covered by a protective film 9. As shown in FIG. 3B, the front ends of the upper and lower magnetic films form the opposing upper and lower magnetic poles that have an intervening magnetic gap film 4, but the width of the upper magnetic pole 11 is narrower than that of the lower magnetic pole 10. Therefore, although the track width of the magnetic head widens based on the width of the lower magnetic pole 10, since the readout output decreases because it is set by the width of the upper magnetic pole, the problems were the difficulty in producing narrower tracks, and not adequately improving the performance and providing higher recording density in the thin film magnetic heads. Also, the projection of the lower magnetic pole has a skin that generates crosstalk that reaches the information recorded on neighboring tracks. Furthermore, since the upper magnetic film is formed using a photoresist on a higher level difference formed by the insulating layer and the conductive coil deposited on the lower magnetic film, it is difficult to control with high precision the track width of the upper magnetic pole.

Japanese patent number 63-55711 proposes a thin film magnetic head in which the upper and lower magnetic pole widths are matched by removing the projection of the lower magnetic pole by ion milling and using the upper magnetic pole or the resist layer formed on it as the mask, and narrower tracks are obtained without lowering the playback output. Similarly, the publication of unexamined Japanese patent application number 5-334621 and the publication of examined Japanese patent application number 6-101098 describe thin film magnetic head tracks where ion milling uses the upper magnetic pole as the mask to form an inclined surface from the magnetic gap side at the corners of the projection of the lower magnetic pole, and the track width only on the inclined surface is narrowed to match the widths of the upper and lower magnetic poles.

Furthermore, the manufacturing method for a thin film head disclosed in the publication of examined Japanese patent application number 5-74127 forms the protective film with a small milling rate on the lower magnetic pole, polishes the protective film to expose the lower magnetic pole, simultaneously ion mills to form the tapered concavity on the lower magnetic pole, and forms the upper magnetic pole on the gap layer in the concavity. Therefore, the track width is narrowed only in the inclined part of the upper magnetic pole to match the widths of the upper and lower magnetic poles.

However, the conventional thin film magnetic head described in Japanese patent number 63-55711 could solve the problems caused by the difference in track widths between the upper and lower magnetic poles and the crosstalk. However, the effect of the large level difference that is formed on the lower magnetic film could not be adequately eliminated by track width control. The ion milling speed is not uniform depending on the position, for example, it becomes slow near the side walls of the upper magnetic pole. In addition, since the lower magnetic pole material removed by ion milling is deposited again on the upper magnetic pole side, the problem is the difficulty in controlling the track width with high precision.

To realize a higher recording density, in addition to a narrower track, the film thicknesses, that is, the pole lengths, of the magnetic poles must be thinner. Since the conventional technology disclosed in the publication of examined Japanese patent application number 5-74127 generally has the problems of controlling with high precision the amount of polishing of the protective film and lower magnetic pole, the film thickness of the lower magnetic pole is hard to adequately control by only ion milling after polishing; this creates large fluctuations. Therefore, the problem is the inability to ensure sufficient reliability.

The manufacturing method for a thin film magnetic head of the present invention considered the conventional problems described above. The objective is to propose a manufacturing method for a thin film magnetic head that has high reliability and improved performance for a thin film magnetic head that has a pair of opposing magnetic poles with an intervening magnetic gap on the substrate that can match the track widths of both magnetic poles, precisely control the widths, and precisely control the film thicknesses of the magnetic poles to produce narrower tracks and a higher recording density.

SUMMARY OF THE INVENTION

After a lower magnetic pole and a magnetic gap film are formed on a substrate that is covered by an insulating film, a mask is formed on the lower magnetic pole. Then the mask and lower magnetic pole are processed to a same width by ion milling. They are sufficiently covered by forming a protective film. The protective film is polished to expose the mask. An exposed surface of the mask and the protective film surface are planarized. The remaining mask is removed by wet etching. A concavity is formed at a position of the lower magnetic pole in the protective film. The upper magnetic pole is formed by electroplating on the concavity. The mask is formed by electroplating Cu or permalloy, or by patterning the photoresist.

BRIEF DESCRIPTION OF THE DRAWINGS

FIG. 2J is the view of the magnetic pole tip of a completed thin film magnetic head from magnetic recording medium side.

Figure 1A:
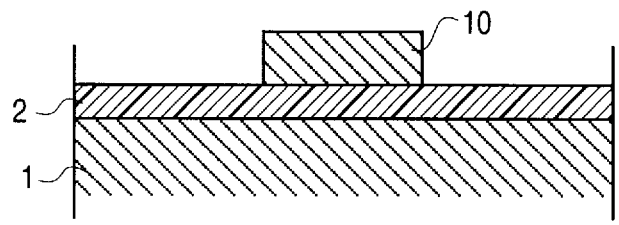
FIGS. 1A to 1E are process diagrams that show the first half of the process of the manufacturing method for a thin film magnetic head according to the present invention.

| | Explanation of Symbols |
|---|---|
| 1 | Substrate |
| 2 | Insulating film |
| 3 | Lower magnetic film |
| 4 | Magnetic gap film |
| 5,6 | Organic insulating layers |
| 7 | Conductive coil |
| 8 | Upper magnetic film |
| 9 | Protective film |
| 10 | Lower magnetic pole |
| 11 | Upper magnetic pole |
| 12 | Base metal film |
| 13 | Resist frame |
| 14 | Mask |
| 15 | Protective film |
| 16 | Concavity |
| 17 | Base metal film |
| 18 | Resist frame |
| 19 | Projection |

DETAILED DESCRIPTION

The present invention achieves the objectives described above and is a manufacturing method for a thin film magnetic head that deposits in layers a magnetic gap film on the substrate covered by an insulating film, a pair of upper and lower magnetic poles with an intervening magnetic gap film, an insulating film, and a conductive coil. This invention features a process that forms the mask on the lower magnetic pole after the lower magnetic pole and the magnetic gap film are formed on the substrate; a process that ion mills at least the parts on the magnetic gap side of the mask and the lower magnetic pole to the same desired track width; a process that forms a protective film to adequately cover the mask and lower magnetic pole, polish the protective film to expose the mask, and planarize the exposed mask surface and at least the nearby surface of the protective film; a process that removes the remaining mask by wet etching and forms a concavity at the position of the lower magnetic pole in the protective film, and a process that forms the upper magnetic pole in the concavity by electroplating. This mask can be suitably formed by electroplating a metal with a Cu or a permalloy, or exposing the photoresist to light and patterning.

According to the present invention, by being able to precisely control the track width of the lower magnetic pole by ion milling and by depositing the upper magnetic pole in the concavity in the protective film formed with the same width as the lower magnetic pole by using a mask, the position and the track width of the upper magnetic pole match those of the lower magnetic pole and can be controlled with high precision. Also, since the lower magnetic pole is protected by the magnetic gap film when the mask is removed and is not affected by wet etching, there is no skin to create fluctuations in the film thickness. Therefore, a thin film magnetic head is designed with narrower tracks and higher recording density, and simultaneously obtains better performance and high reliability.

Next, an ideal embodiment of the present invention is described in detail while referring to the attached drawings.

FIGS. 1 and 2 show the manufacturing method for a thin film head according to the present invention in the process order. First, after common manufacturing technologies for thin film are used to deposit the base metal for plating, for example, NiFe, NiFe/Ti, Cu/Cr, or simple Cu, on the substrate 1 that has an insulating film 2 of alumina and pattern the photoresist to form the resist frame, the lower magnetic film is formed by depositing the permalloy (for example, NiFe) by electroplating. The resist frame and the unneeded parts of the magnetic film and the base metal film are removed. As shown in FIG. 1A, the lower magnetic pole 10 with the desired dimensions and film thickness is formed on the substrate.

Figure 1B:
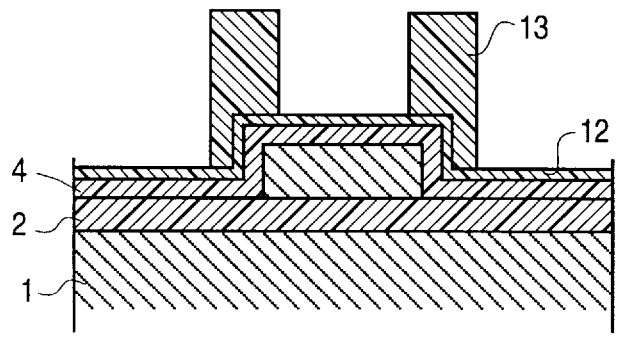
Figure 1C:
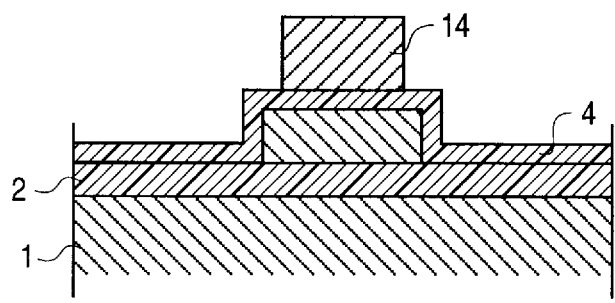

The magnetic gap film 4 composed of an oxide insulating material such as alumina is formed by sputtering on the lower electrode 10. As when forming the lower magnetic pole 10, the base metal film 12 for plating is deposited. The photoresist is patterned to form the resist frame 13 (FIG. 1B). By using this and depositing a 5-:m thick metal film of Cu or permalloy by electroplating, the mask 14 shown in FIG. 1C is formed on the lower magnetic pole 10. The permalloy that forms the mask does not necessarily have the same composition as the magnetic pole material. In another embodiment, the mask 14 can be similarly formed by patterning a photoresist and not a Cu or a permalloy metal material.

Figure 1D:
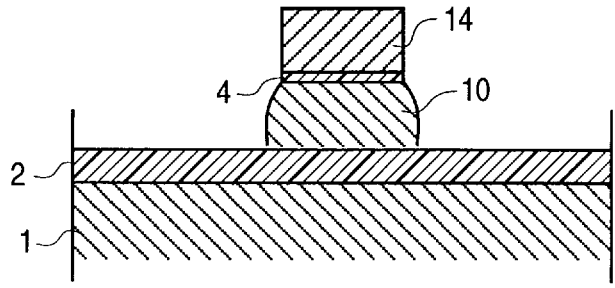
Figure 1E:
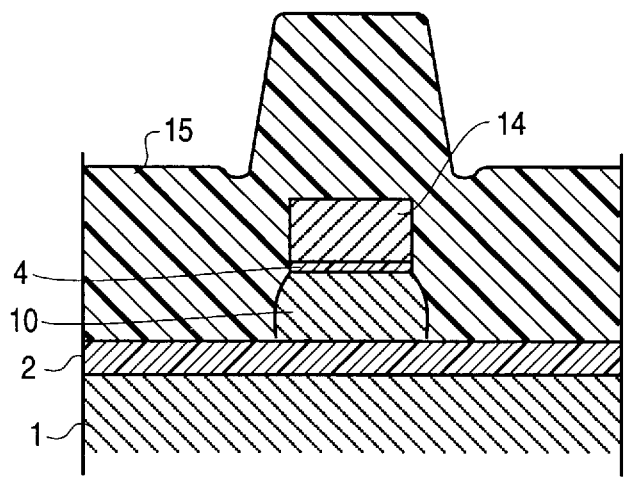

Next, the technique called pole trimming is used to ion mill the mask 14 and simultaneously dry etch the magnetic gap film 4 and lower magnetic pole 10. Therefore, the parts within about a 1-:m thickness on the magnetic gap side of the mask 14, magnetic gap film 4, and lower magnetic pole 10 are processed to have the same widths, that is, the desired track width (FIG. 1D). A protective film 15 of the same material as the insulating film 2 is formed on top to adequately cover the mask 14 as shown in FIG. 1E.

Figure 2F:
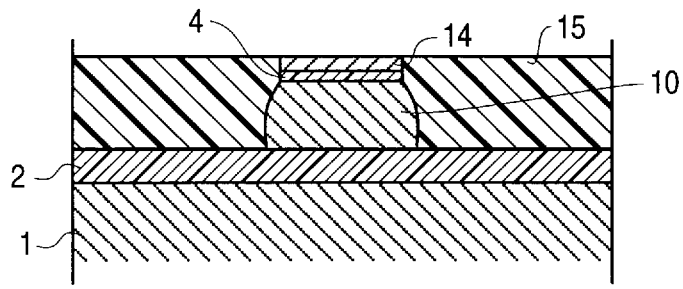
FIGS. 2F to 2J are process diagrams that show the last half of the process of the manufacturing method in FIGS. 1A to 1E.
Figure 2G:
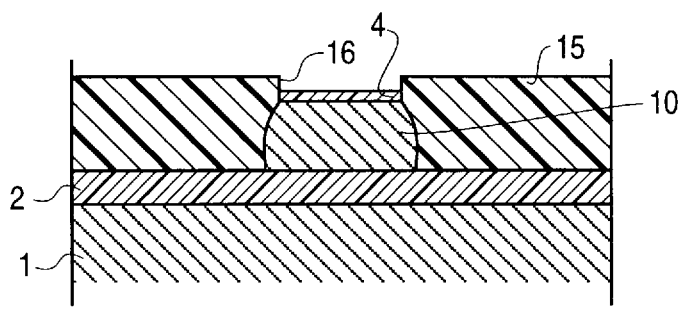

The protective film 15 is polished to expose the mask 14. The exposed surface of the mask and at least the nearby surface of the protective film 15 are planarized (FIG. 2F). By wet etching to remove the remaining mask 14, the concavity 16 is formed at the position of the lower magnetic pole 10 in the protective film 15. A well-known etching fluid is suitably selected for the mask material. For example, a Cu mask can be removed by peroxosulfuric acid. The concavity 16 has vertical sides that extend the entire length and ensure the same track width as the lower magnetic pole 10. Since the lower magnetic pole 10 is entirely covered by the magnetic gap film 4 and protective film 15, there is no skin to corrode and degrade when the mask is wet etched.

Figure 2H:
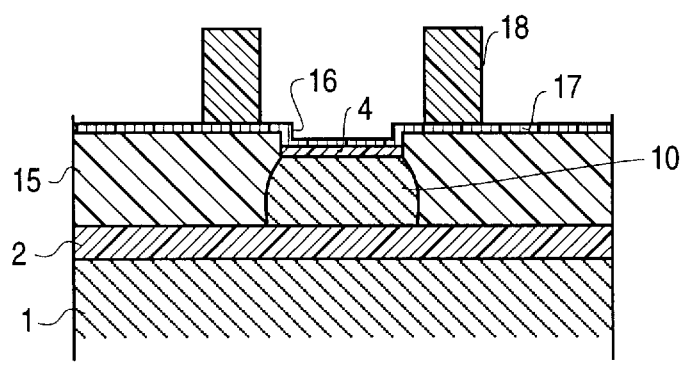
Figure 2I:
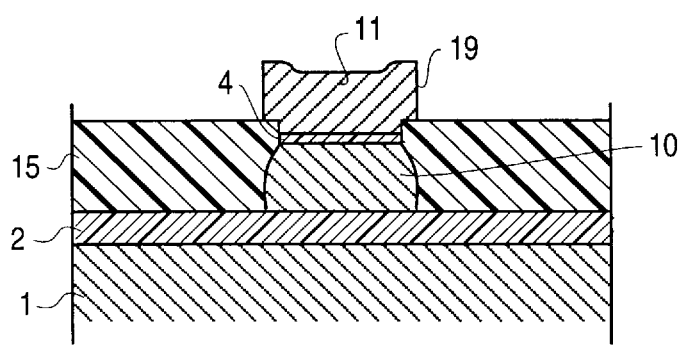
Figure 2J:
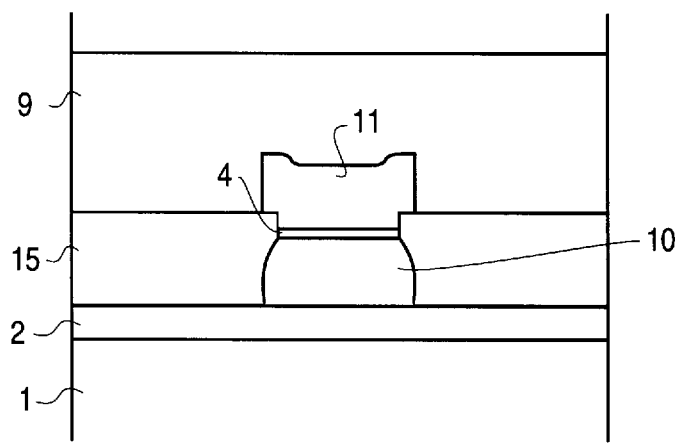
Figure 3A:
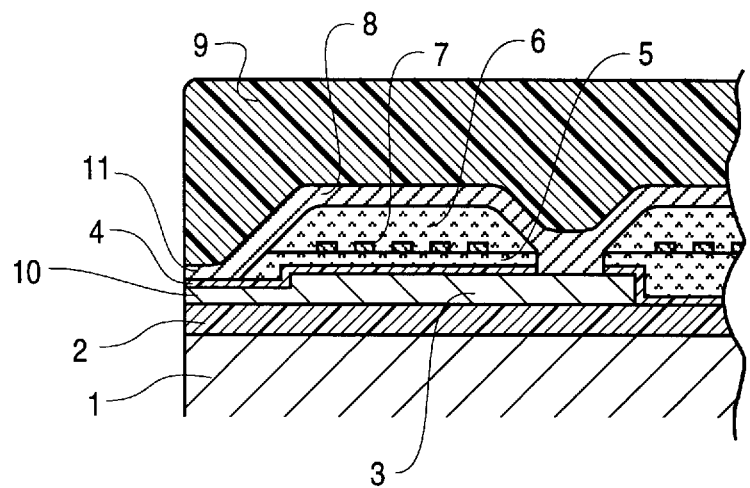
FIG. 3A is a cross-sectional diagram that shows the structure of a conventional thin film magnetic head.
Figure 3B:
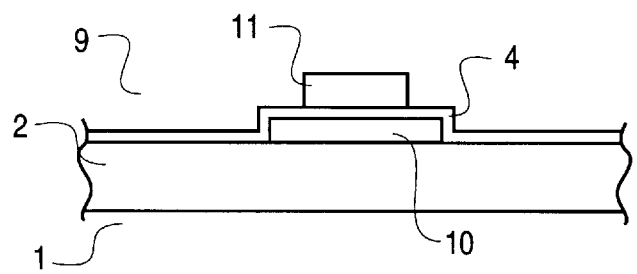
FIG. 3B is an enlarged diagram of the magnetic tip viewed from the magnetic recording medium.

Next, after the organic insulating layer and conductive coil are deposited and the base metal film 17 for plating, such as NiFe, is covered, the photoresist is patterned and the resist frame 18 that conforms to the dimensions of the upper magnetic pole is formed near the ends of the concavity 16 (FIG. 2H). When the magnetic film composed of NiFe by electroplating is deposited for the required length on the upper magnetic pole, and the resist frame 18 and the unneeded parts of the magnetic film and the base metal 17 are removed, the upper magnetic pole 11 is formed as shown in FIG. 2E. Furthermore, by covering the entire substrate with a protective film 9 such as alumina, the desired thin film magnetic head is obtained (FIG. 2J).

The lower magnetic pole 10 described above is processed so that the part on the magnetic gap side has the desired track width. In the upper magnetic pole 11, the part that projects up from the protective film 15 projects out from the track width of the lower magnetic pole 10. However, the part on the magnetic gap side is formed with the same width as the track width of the lower magnetic pole 10 by the concavity 16. Consequently, even if some position offset is produced in the resist frame 18, the track widths of the upper and lower magnetic poles 10, 11 can be controlled with high precision to the same dimensions. In addition, the projection 19 of the upper magnetic pole 11 does not affect the playback output and the crosstalk does not occur.

In this embodiment, the depth of the concavity 16 in the protective film 15 is shallower than the desired film thickness of the upper magnetic pole 11. However, in another embodiment, the concavity 16 can be formed deeper than the film thickness of the upper magnetic pole by depositing a mask 14 and a protective film 15 with the proper thickness. In this case, the entire upper magnetic pole 11 is formed inside the concavity 16 with the protective film 15 as the frame. As is clear to professionals in the field, the present invention can be implemented by adding various variations and modifications to the embodiment described above within the technological scope.

In the present invention structured as described above, the effects given below are obtained.

Based on the method of the present invention, the track width and film thickness of the lower magnetic pole can be controlled with high precision to the desired dimensions. By depositing the upper magnetic pole in the concavity of the protective film formed in the track width of the lower magnetic pole by the mask that is processed simultaneously with the lower magnetic pole, the position and track width of the upper magnetic pole can be controlled with high precision to match those of the lower magnetic pole. Therefore, narrower tracks, higher recording densities, and improved performance can be designed, and a highly reliable thin film magnetic head can be obtained.

We claim:

1. A method of manufacturing a thin film magnetic head having a magnetic gap film on a substrate covered by a protective film, a pair of opposing upper and lower magnetic poles that sandwich the magnetic gap, an insulating layer, and a conductive coil, the method comprising the steps of:

forming a mask on the lower magnetic pole after the lower magnetic pole and magnetic gap film are formed on the substrate;

ion milling portions of the mask and the lower magnetic pole on a magnetic gap side to a desired track width;

forming a protective film that adequately covers the mask and the lower magnetic pole;

polishing the protective film to expose the mask;

planarizing the exposed surface of the mask and a nearby protective film surface;

removing the mask by wet etching to form a concavity at a position of the lower magnetic pole in the protective film; and forming the upper magnetic pole by electroplating the concavity.

2. The method of manufacturing the thin film magnetic head of claim 1 including the step of forming the mask by electroplating copper (Cu) or permalloy.

3. The method of manufacturing the thin film magnetic head of claim 1 including the step of forming the mask by patterning a photoresist.

* * * * *

UNITED STATES PATENT AND TRADEMARK OFFICE
CERTIFICATE OF CORRECTION

PATENT NO. : 5,863,448
DATED : January 26, 1999
INVENTOR(S) : Otani et al.

It is certified that error appears in the above-identified patent and that said Letters Patent is hereby corrected as shown below:

On the title page, item [73] Assignee, "Read Rite Corporation, Osaka, Japan" should read --Read Rite SMI Corporation, Osaka Japan--.

Signed and Sealed this

Seventeenth Day of August, 1999

Attest:

Q. TODD DICKINSON

*Attesting Officer*    *Acting Commissioner of Patents and Trademarks*